(12) United States Patent
Chi

(10) Patent No.: US 6,243,807 B1
(45) Date of Patent: Jun. 5, 2001

(54) OPTIMIZING CACHE DATA LOAD REQUIRED FOR FUNCTIONS IN LOOP ROUTINE BY SEQUENTIALLY COLLECTING DATA IN EXTERNAL MEMORY FOR SINGLE BLOCK FETCH

(75) Inventor: Ben H. F. Chi, Fremont, CA (US)

(73) Assignee: PC-Tel, Inc., San Jose, CA (US)

( * ) Notice: Subject to any disclaimer, the term of this patent is extended or adjusted under 35 U.S.C. 154(b) by 0 days.

(21) Appl. No.: 09/176,739

(22) Filed: Oct. 20, 1998

(51) Int. Cl.[7] .................................................. G06F 9/312
(52) U.S. Cl. ........................ 712/241; 713/225; 711/137; 717/4
(58) Field of Search ..................................... 717/708, 709, 717/704; 712/241, 225; 711/137

(56) References Cited

U.S. PATENT DOCUMENTS

| | | | |
|---|---|---|---|
| 4,991,088 | * 2/1991 | Kam ........................................ | 717/9 |
| 5,113,370 | * 5/1992 | Tomita ................................. | 712/241 |
| 5,303,377 | * 4/1994 | Gupta et al. ............................. | 717/9 |
| 5,797,013 | * 8/1998 | Mahadevan et al. ..................... | 717/9 |
| 5,835,776 | * 11/1998 | Tirumalai et al. ....................... | 717/9 |
| 5,918,246 | * 6/1999 | Goodnow et al. ................... | 711/137 |
| 5,930,507 | * 7/1999 | Nakahira et al. ........................ | 717/5 |

\* cited by examiner

Primary Examiner—Kenneth S. Kim
(74) Attorney, Agent, or Firm—Skjerven Morrill MacPherson (57) ABSTRACT

The performance of a computer architecture having cache memory is optimized by reorganizing the structure of information before such information is written into an external memory coupled to a processor. Specifically, loops of repeated processing steps are identified, each loop routine operating upon particular data and in response to particular instructions. The instructions and data for these loop routines are organized into structures of information, each of which comprises all instructions or data for one loop routine. Each structure is stored into external memory and can be brought into cache memory as a single block of information.

3 Claims, 4 Drawing Sheets

OPTIMIZING CACHE DATA LOAD REQUIRED FOR FUNCTIONS IN LOOP ROUTINE BY SEQUENTIALLY COLLECTING DATA IN EXTERNAL MEMORY FOR SINGLE BLOCK FETCH

TECHNICAL FIELD OF THE INVENTION

The present invention relates generally to the field of computer architecture, and in particular, to optimizing the performance of a computer architecture by organizing functions within a loop routine.

BACKGROUND OF THE INVENTION

In a typical computer architecture, a central processing unit (CPU) controls computer operations and provides processing capability. In particular, a CPU can receive instructions and data. Acting under the instructions, the CPU processes the data—i.e., accepts data, performs one or more operations on the data, and returns corresponding results. With modern technology, a CPU can be implemented on a single integrated circuit (IC) device.

A CPU is generally supported by several different types of memory, each of which can store information for data or instructions. These different types of memory may include cache memory, external IC memory, and mass memory. Cache memory is internal to the CPU (i.e., implemented on the same IC device as the CPU) and comprises high-speed memory for storing frequently used data or instructions. The cache memory enables a processor to get data and instructions much more quickly than if the same information were stored in some other type of memory. External memory is typically implemented on an IC device separate from that on which the CPU is implemented and can be in the form of random access memory (RAM). RAM can be either dynamic RAM (DRAM) or static RAM (SRAM). Individual data stored in a external memory can be accessed directly by the CPU. External memory is slower than cache memory. Mass memory may comprise disc and/or tape storage devices. Mass memory holds more information than either cache memory or external memory, but is generally slower than both.

In typical operation, information which is relevant for current operations by a CPU are held in cache memory. Such information can be either data or instructions. Data is generally information which may be manipulated, operated upon, or otherwise processed. In some cases, data can be defined and structured in arrays, with each array having a separate array operand. An instruction is information which may be used to command, direct, or otherwise control operations in a computer. Instructions are typically executed by performing one or more functions.

If information which is needed for processing is not contained within cache memory, the processor may direct that such information be retrieved from external memory or mass memory. With direct mapped cache, information within a particular part of external memory can only be mapped into a specific part of cache memory. In such case, the new information is brought into the cache memory where it overwrites the old information. As such, cache memory is constantly overwritten during typical operation of a computer architecture.

In some cases, especially loop operations or routines, the same information (i.e., data or instructions) may be written multiple times into cache memory during execution of the loop routine. That is, the same information is brought into cache memory, overwritten, and then brought in again at another point within the same loop routine. This process of repeatedly retrieving and overwriting the same information in cache memory during a loop routine is extremely inefficient, and thus, adversely impacts the performance of the computer architecture.

SUMMARY

The present invention optimizes the performance of a computer architecture having direct mapped cache.

In accordance with one embodiment of the present invention, a method for optimizing the performance of a computer architecture comprises the following steps: identifying all functions for a loop routine, the functions for executing a plurality of instructions; creating a function sequence file in which the functions are arranged according to a calling sequence of the loop routine; and storing the instructions into an external memory according to the function sequence file.

In accordance with another embodiment of the present invention, a method for optimizing the performance of a computer architecture comprises the following steps: identifying all data arrays for a loop routine; determining an existing data structure for each data array, each existing data structure comprising a respective operand; defining a new data structure for each data array, each new data structure not including any operand; redefining the loop routine based upon the new data structures; and storing data into an external memory according to the new data structures.

An important technical advantage of the present invention includes reorganizing the structure of information before such information is written into an external memory coupled to a processor. Specifically, loops of repeated processing steps are identified, each loop routine operating upon particular data and in response to particular instructions. The instructions and data for these loop routines are organized into structures of information, each of which comprises all instructions or data for one loop routine. Each structure is stored into external memory and can be brought into cache memory as a single block of information.

In one embodiment, a structure for the instruction(s) associated with a loop routine is generated as follows. The executable functions for each instruction are identified and the sequence/order of execution determined. The functions are organized into a text file in the order of execution. This text file is written into external memory as a single block of information. When the respective loop routine is executed by a processor, the entire block of information is brought into cache memory. Because all of the instructions for the loop routine are present at once in cache memory during execution of the loop routine, the cache memory is not continuously overwritten with the same instructions.

In another embodiment, a structure for the data associated with a loop routine is generated as follows. The arrays of data operated upon by the loop routine are identified. The respective operands for each array are separated. A new data structure is created using the operands only. Furthermore, for each old data array, a new data structure is created from the portion the array remaining after separation of the respective operand. The new data structures are then stored in their entirety in respective blocks of external memory. When the respective loop routine is executed, these data structures are retrieved and stored as a whole in cache memory. As such, the same data does not need to be repeatedly written into cache memory.

Thus, in the manner described herein, the present invention optimizes the performance of a computer architecture having direct mapped cache memory.

Other important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1 through 4 of the drawings. In the various drawings, like numerals are used for like and corresponding parts.

It should be understood that the programs, processes, methods, and the like, described herein are but an example of one implementation of the present invention and are not related or limited to any particular computer, apparatus, or computer language. Rather, various types of general purpose computing machines or devices may be used with programs constructed in accordance with the teachings described herein.

Figure 1:
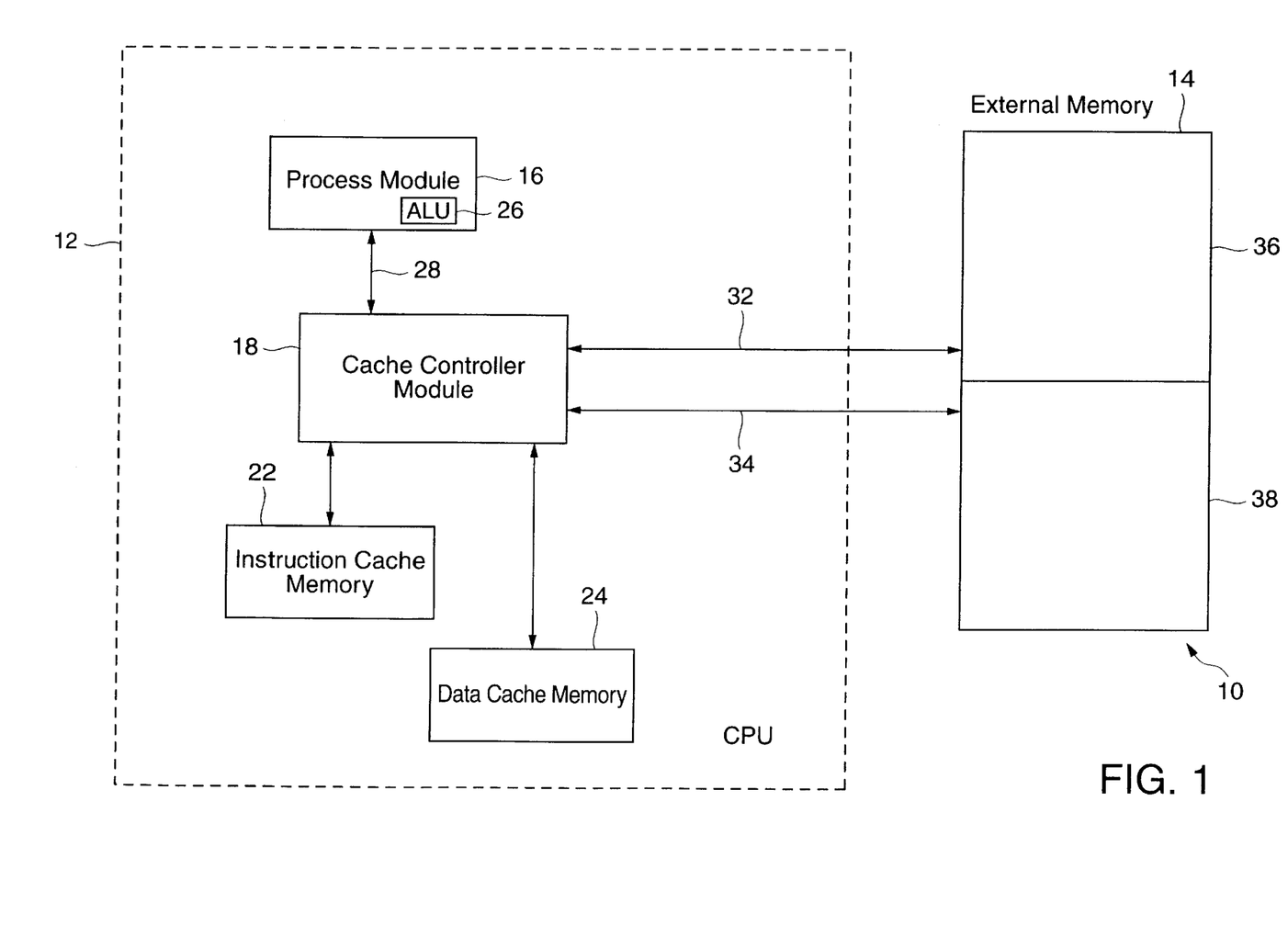
FIG. 1 illustrates an exemplary computer architecture, the operation of which can be optimized by the present invention.

Referring now to the drawings, FIG. 1 illustrates an exemplary computer architecture 10, the operation of which can be optimized by the present invention. It should be understood that manipulations within computer architecture 10 are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with the human operator or user that interacts with the computer.

As shown, computer architecture 10 comprises a central processing unit (CPU) 12 coupled to an external memory device 14. As used herein the terms "coupled," "connected," or any variant thereof, means any coupling or connection, either direct or indirect, between two or more elements.

CPU 12 generally functions to control the operation of computer architecture 10 and to provide processing capability for the same. CPU 12 can be implemented on a single integrated circuit (IC) device. As depicted, CPU 12 comprises a process module 16, cache controller module 18, instruction cache memory 22, and data cache memory 24.

Process module 16 orchestrates the operation of CPU 12. Process module 16 receives information, both data and instructions. As explained above, data is generally information which may be manipulated, operated upon, or otherwise processed, and instructions are information which is used to command, direct, or otherwise control operations in a computer. Process module 16 is responsive to the instructions and may operate upon the data. As depicted, process module 16 may include an arithmetic logic unit (ALU) 26. ALU 26 executes logic and arithmetic operations as specified by an instruction set (e.g., micro-codes) for CPU 12. These operations may include adding, subtracting, multiplying, and dividing.

Cache controller module 18 is coupled to process module 16 via data bus 28. Cache controller module 18 manages or controls the transfer of information (e.g., data and/or instructions) from external memory 14 and cache memories 22 and 24. Data bus 28 supports the transfer of information between process module 16 and instruction cache memory 22 and data cache memory 24.

Instruction cache memory 22 and data cache memory 24 each comprises high-speed cache memory which may be used to store frequently used data or instructions. In one embodiment, instruction cache memory 22 may comprise four K-bytes of memory and data cache memory 24 may comprise one K-byte of memory. Cache memory enables process module 16 to get the data and the instructions much more quickly than if process module 16 had to retrieve the same information from external memory 14. For example, a block of records from a data base might be stored in data cache memory 24, so that process module 16 could quickly access and scan them.

Instruction cache memory 22 and data cache memory 24 each generally works as follows. When process module 16 references an address in memory, cache controller module 18 checks to see whether one of cache memories 22 or 24 holds that address. If one of cache memories 22 or 24 holds such address, the corresponding data or instruction is returned to process module 16. If cache memories 22 and 24 do not hold the address, a memory access into external memory 14 is performed.

As depicted, cache memories 22 and 24 constitute level 1 (L1) cache memory which is located on the same chip as CPU 12. Alternatively, one or both of cache memories 22 and 24 could be implemented as level 2 (L2) cache memory, which is external to CPU 12.

External memory 14 is connected to cache controller module 18 via bi-directional data buses 32 and 34. Data bus 32 may carry instructions and address information between external memory 14 and instruction cache memory 22; data bus 34 carries data between external memory 14 and data cache memory 24. External memory 14 generally functions to store information which may be used within CPU 12. External memory 14 operates at a slower speed than cache memories 22 and 24 internal to CPU 12, but at speeds faster than mass memory (e.g., disc or tape storage). External memory 14 may be implemented on its own separate IC device.

External memory 14 may comprise some form of random access memory (RAM), such as dynamic RAM (DRAM) or static RAM (SRAM). A DRAM is considered to be volatile memory because it needs to be recharged or refreshed hundreds of times per second in order to retain the information stored therein. Various versions of DRAM include extended data out (EDO) DRAM and synchronous DRAM (SDRAM). SRAM is non-volatile memory which does not require frequent refreshing.

External memory 14 generally comprises a plurality of memory cells—each accessible by a respective address—for storing information. In one embodiment, a first portion 36 of external memory 14 may be used for storing instructions, and a second portion 38 may be used for storing data. The stored information may be input into CPU 12 as necessary for processing. Furthermore, resultant information may be returned to external memory 14.

In general, the present invention optimizes the performance of computer architecture 10 by organizing information in a particular way prior to storage into external memory 14. Specifically, the present invention identifies information associated with one or more processing loop routines, wherein each loop routine is a series of steps which may be repeatedly performed by CPU 12. Each loop routine operates upon particular data and in response to particular instructions. The present invention manipulates, reorganizes, stores, and retrieves this loop information in the following manner.

A structure for the instruction(s) associated with a processing loop routine is generated as follows. The executable functions for each instruction are identified and the sequence/order of execution determined. The functions are organized into a text file in the order of execution. This text file is written into external memory 14 as a single block of information. When CPU 12 executes the respective loop routine, the entire block of information is retrieved from external memory 14 and written into instruction cache memory 22. From instruction cache memory 22, individual instructions/functions are retrieved as necessary by process module 16. Because all of the instructions for the loop routine are present at once in instruction cache memory 22 during execution of the loop routine, the cache memory is not continuously overwritten with the same instructions.

A structure for the data associated with a processing loop routine is generated as follows. The arrays of data operated upon by the loop routine are identified. The respective operands for each array are separated. A new data structure is created using the operands only. Furthermore, for each old data array, a new data structure is created from the portion the array remaining after separation of the respective operand. The new data structures are then stored in their entirety in respective blocks of external memory 14. When CPU 12 executes the respective loop routine, these data structures are retrieved from external memory 14 and written in their entirety into data cache memory 24. As such, the same data does not need to be repeatedly written into cache memory.

Accordingly, information, either instructions or data, does not need to be repeatedly written into cache memory during execution of loop routines. Thus, the present invention optimizes the performance of a computer architecture 10 having direct mapped cache memory.

Figure 2:
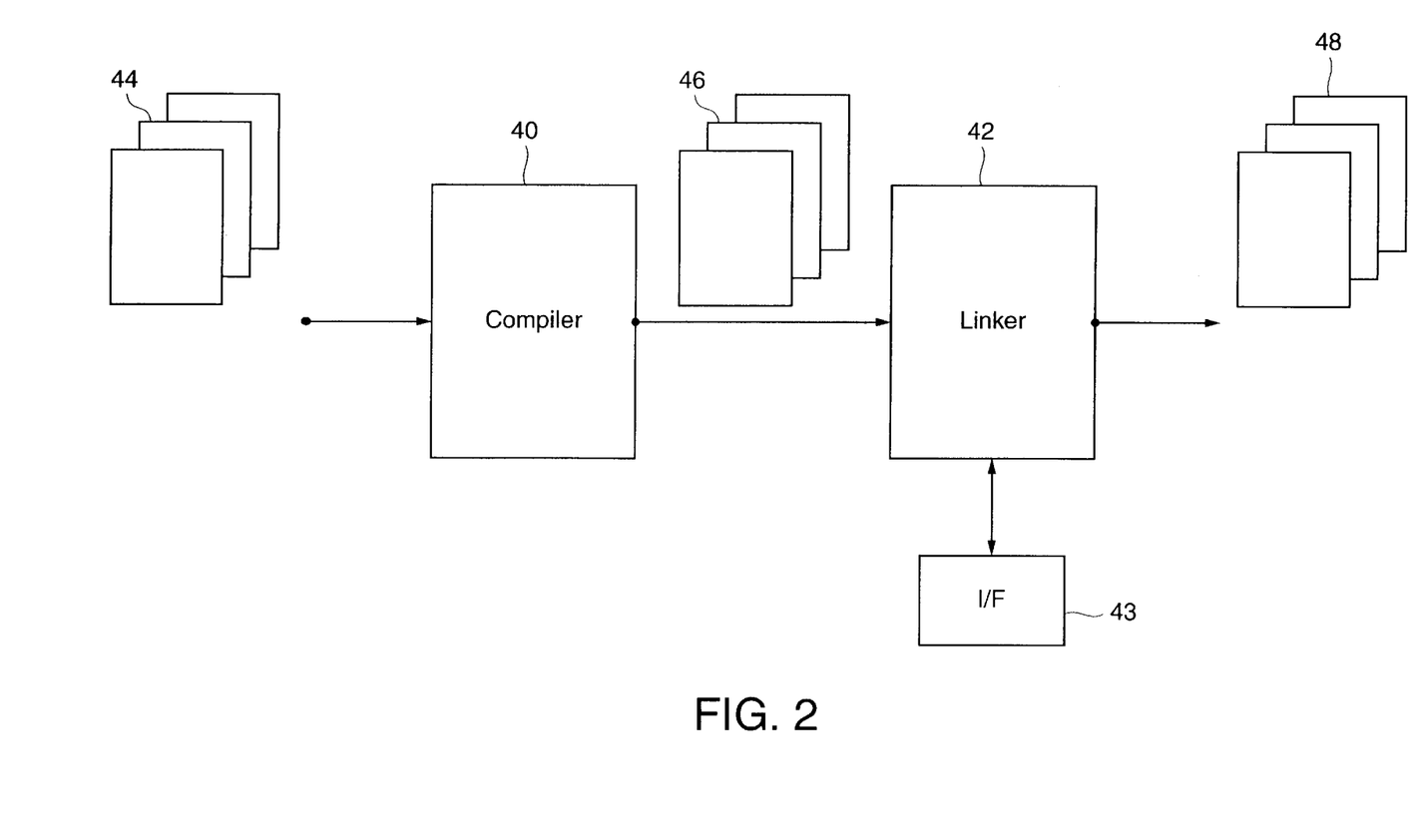
FIG. 2 illustrates a compiler, a linker, and an interface for generating code and data sequences which are used to optimize the performance of a computer architecture, in accordance with an embodiment of the present invention.

FIG. 2 illustrates a compiler 40, a linker 42, and an interface (I/F) 43 for generating code and data sequences which are used to optimize the performance of computer architecture 10, in accordance with an embodiment of the present invention.

Compiler 40 receives files 44 of computer code written in a high-level programming language, such as C or C++. In general, compiler 40 generally comprises a system application which converts all statements in the high-level computer code of files 44 into machine language instructions. These machine language instructions may be formatted in a mid-level computer language, such as, for example assembly language. The mid-level computer code is output as files 46 by compiler 40.

Mid-level computer code may comprise various routines and sub-routines, each of which may be implemented using one or more executable loop routines. Each of these loop routines may comprise a number of processing steps which are repeated during execution. These loop routines may specify elements data which are repeatedly used during operation. Each loop routine operates upon particular data and in response to particular instructions.

Linker 42 converts the files 46 of mid-level computer code into low-level computer code output as files 48. Specifically, linker 42 comprises a system application which forms a final machine-language program and initiates its execution. Linker 42 can also be referred to as a loader. The low-level computer code of files 48 output by linker 42 is understandable by a computer or processor, such as CPU 12.

Interface 43 is coupled to linker 42. Interface 43 allows a user to interact with linker 42, for example, to input, view, and/or manipulate information. The functionality of interface 43 can be performed by one or more suitable input devices, such as a key pad, touch screen, input port, pointing device (e.g., mouse), and/or other device that can accept information, and one or more suitable output devices, such as a computer display, output port, speaker, or other device for conveying information, in various forms including digital data, visual information, or audio information.

In accordance with one embodiment of the present invention, a user, via interface 43, modifies the files 46 of mid-level computer code within linker 42 so that data and instructions contained therein are organized into structures which optimize the operation of computer architecture 10. In an alternative embodiment, a computing device driven by suitable software can interact with linker 42 at interface 43 to achieve the same result. Translated versions of these structures appear in files 48 of low-level computer code. This low-level computer code, having the translated structures, can be stored in external memory 14.

Figure 3:
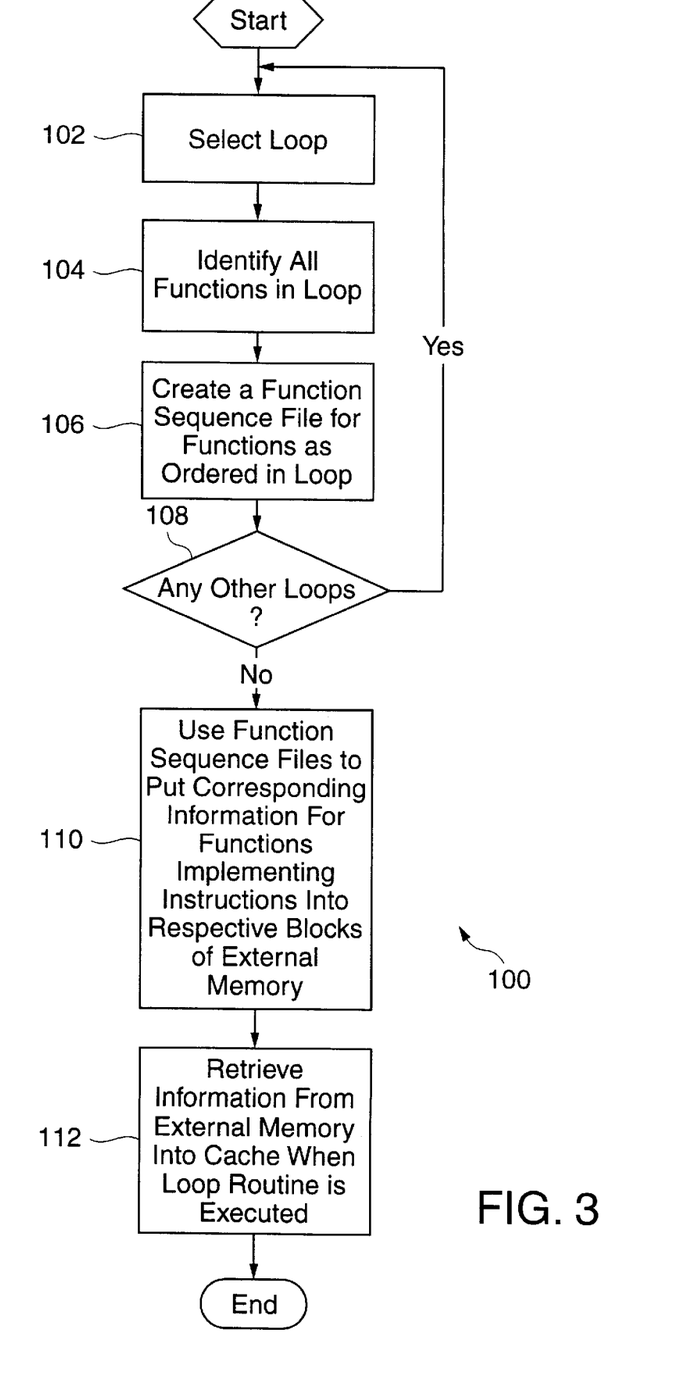
FIG. 3 is a flow chart of a method for organizing instructions, in accordance with an embodiment of the present invention.

FIG. 3 is a flow chart of a method 100 for organizing computer instructions in order to optimize the performance of a computer architecture, in accordance with an embodiment of the present invention. In one embodiment, at least some of the steps of method 100 can be performed by a user interacting with linker 42 via interface 43 (FIG. 2), while in an alternative embodiment all steps of method 100 are performed by a computer driven by suitable software communicating with linker 42.

In general, method 100 arranges or organizes various instructions for one or more respective loop routines contained within computer code of the type input into linker 42. Each instruction is executed by performing one or more functions which are called in a particular sequence or order. In one embodiment, method 100 is used during the linking process of the mid-level code compilation performed at linker 42 to arrange the functions involved in each loop routine by their calling sequence.

Method 100 begins at step 102 where a loop routine is selected from the computer code. An exemplary loop routine is as follows:

```
Loop (100)
{
    functionA();
    functionB();
    functionC();
    functionD();
    functionE();
}
```

During execution of this loop routine, five functions—"functionA," "functionB," "functionC," "functionD," and "functionE"—are sequentially performed one-hundred times.

At step 104, all functions within the selected loop routine are identified. Thus, in the exemplary loop routine, functionA, functionB, functionC, functionD, and functionE are identified.

At step 106, a user or a software-driven computer creates a function sequence file which contains all of the functions as ordered or sequenced in the selected loop routine. This function sequence file can be a text file.

In one embodiment, if a WINDOWS™ operating system is used, the "ORDER" option in a linker can be used to specify the function sequence file to be a text file. An exemplary function sequence file, named "funcOrder.txt," is as follows:

funcOrder.txt
  functionA()
  functionB()
  functionC()
  functionD()
  functionE()

In another embodiment, if a GNU™ compiler is used, each function can be set up as a separate file, a file sequence can be specified based on the object code linking sequence, and a function sequence file can be determined based on the file sequence.

As an example for the creation of a function sequence file using a GNU compiler, assume that the exemplary loop routine described above is supported by a first file ("File1.c") containing functionA, functionC, and functionE, and a second file ("File2.c") containing functionB and functionD. File1.c and File2.c are structured as follows:

| | | |
|---|---|---|
| File1.c | | |
| | FunctionA() | {....} |
| | FunctionC() | {....} |
| | FunctionE() | {....} |
| File2.c | | |
| | FunctionD() | {....} |
| | FunctionB() | {....} |

From File1.c and File2.c, new function files—"File3.c," "File4.c," "File5.c," "File6.c," and "File7.c"—are generated. Each of these new function files contains a single function as follows:

| | | |
|---|---|---|
| File3.c | | |
| | FunctionA() | {....} |
| File4.c | | |
| | FunctionB() | {....} |
| File5.c | | |
| | FunctionC() | {....} |
| File6.c | | |
| | FunctionD() | {....} |
| File7.c | | |
| | FunctionE() | {....} |

Each of File3.c, File4.c, File5.c, File6.c, and File7.c is associated with a respective object file. These object files can be "File3.obj," "File4.obj," "File5.obj," "File6.obj," and "File7.obj," respectively. The object files can be linked in an object code linking sequence.

In linker 42, based upon the object code linking sequence, the associated object files are specified in a file sequence as follows:
  File3.obj
  File4.obj
  File5.obj
  File6.obj
  File7.obj A function sequence file is then created from the file sequence. In the function sequence file, the functions are arranged by their calling sequence in the relevant loop routine.

After a function sequence file has been created for the relevant loop routine (e.g., using either the WINDOWS™ operating system or the GNU™ compiler), method 100 determines, at step 108, whether there are any other loop routines within the relevant computer code. If there are more loop routines, method 100 returns to step 102 where the next loop routine is selected. Method 100 repeats steps 102 through 108 until a respective function sequence file has been created for each loop routine. When it is determined that there are no other loop routines within the relevant computer code, method 100 proceeds to step 110.

At step 110, linker 42 uses each function sequence file to put corresponding instructions into respective blocks of external memory 14. The instructions for each particular loop routine are stored as a single block in external memory 14.

At step 112, from external memory 14, the instructions for a given loop routine can retrieved as a single block and input into an instruction cache memory 22 whenever that loop routine is executed. Once in instruction cache memory 22, the individual instructions can be used to direct, control, or otherwise instruct the operation of CPU 14. Because all instructions for the relevant loop routine are simultaneously present in instruction cache memory 22 during execution of the loop routine, the same information does not need to be repeatedly written into the memory throughout execution.

Figure 4:
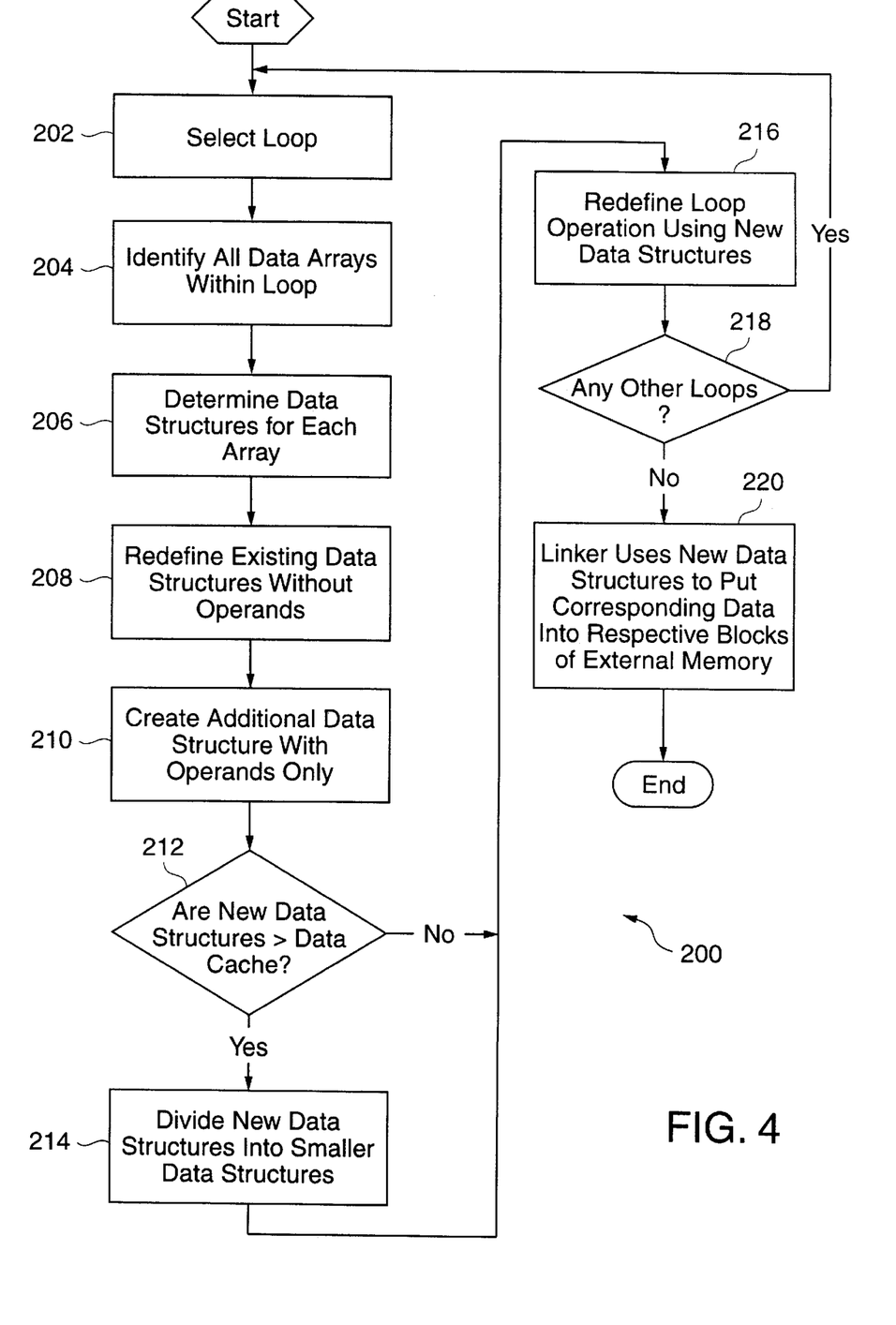
FIG. 4 is a flow chart of a method for organizing data, in accordance with an embodiment of the present invention.

In other words, all the physical addresses of the functions in the loop routine are directly mapped into instruction cache memory 22 in a sequence that minimizes the cache miss. This reduces the execution time for looped routines involving multiple functions in a CPU with direct mapped instruction cache architecture. Accordingly, the present invention optimizes the performances of computer architecture 10. Method 100 ends FIG. 4 is a flow chart of a method 200 for organizing computer data in order to optimize the performance of a computer architecture, in accordance with an embodiment of the present invention. In one embodiment, at least some of the steps of method 200 can be performed by a user interacting with linker 42 via interface 43 (FIG. 2), while in an alternative embodiment all steps of method 200 are performed by a computer driven by suitable software communicating with linker 42.

In general, method 200 arranges or organize various data that may be repeatedly operated upon within one or more loop routines contained within computer code of the type input into linker 42. In particular, method 200 arranges the data processed in loop routines during the linking process of the mid-level code compilation performed at linker 42. This data may be defined and structured in arrays.

Method 200 begins at step 202 where a particular loop routine is selected from the computer code. An exemplary loop routine is as follows:

```
For (I=0; I < 300; I++)
{
    Gc.C[I] = Ga.A[I] + Gb.B[I];
}
``` where "A[I]," "B[I]," and "C[I]" are data arrays. Data arrays A[I], B[I], and C[I] can be formatted or defined in structures "Ga," "Gb," and "Gc," respectively.

Specifically, A[I] is defined in Ga structure, such as follows:

```
Struct {
    Char    ga1[300];
    Char    A[300];
    Char    ga2[500];
}Ga;
```

B[I] is defined in Gb structure, such as follows:

```
Struct {
    Char    gb1[300];
    Char    B[300];
    Char    gb[500];
}Gb;
``` and C[I] is defined in Gc structure, such as follows:

```
Struct {
    Char    gc1[300];
    Char    C[300];
    Char    gc2[500];
}Gc;
```

Within the above structures, "A[300]," "B[300]," and "C[300]" are operands, each of which comprises 300 bytes. Accordingly, each data array has an array size of 300 bytes.

At step 204, all data arrays within the selected loop routine are identified. Thus, with reference to the present example, A[I], B[I], and C[I] are identified. At step 206, method 200 determines the data structures for each array. Thus, structures Ga, Gb, and Gc are identified in the present example.

At step 208, the data structures are redefined so that the operands are removed. Thus, with the present example, structures Ga, Gb, and Gc are redefined without operands A[300], B[300], and C[300]. Data arrays A[I], B[I], and C[I] are then formatted in the redefined data structures.

Specifically, A[I] is defined in Ga structure; such as follows:

```
Struct {
    Char    ga1[300]
    Char    ga2[500]
}Ga;
```

B[I] is defined in Gb structure, such as follows:

```
Struct {
    Char    gb1[300]
    Char    gb2[500]
}Gb;
``` and C[I] is defined in Gc structure, such as follows:

```
Struct {
    Char    gc1[300]
    Char    gc2[500]
}Gc;
```

At step 210, an additional structure which contains only the operands is created. With respect to the present example, this structure "Gd" containing operands A[300], B[300], and C[300] is as follows:

```
Struct {
    Char    A[300]
    Char    B[300]
    Char    C[300]
}Gd;
```

At step 212, a determination is made as to whether the new data structures are larger than the data cache memory 24 of a CPU 12. If it is determined that the new data structures are not larger than cache memory 24, method 200 moves to step 216 where the relevant loop operation is redefined using the new data structures. With respect to the present example, the loop operation can be redefined as follows:

```
For (I = 0; I < 300; I++)
{
    Gd.C[I] = Gd.A[I] + Gd.B[I];
}
```

Otherwise, if it is determined at step 212 that the new data structures are larger than cache memory 24, the new data structures are divided into smaller data structures at step 214.

For example, assume that instead of having an array size of 300 bytes, each data array has an array size of 600 bytes—i.e., operands A[600], B[600], and C[600]. Further assume that the data cache memory 24 comprises 1 K-byte of memory. Collectively, the new data structures are larger than the size of data cache memory 24.

Accordingly, the newly created data structures can be divided into smaller data structures "Gd1" and "Gd2" as follows:

```
Struct {
    Char    A[300]
    Char    B[300]
    Char    C[300]
}Gd1;
Struct {
    Char    A[300]
    Char    B[300]
```

-continued

```
         Char   C[300]
        }Gd2;
```

Afterwards, method 200 moves to step 216 where the loop operation is redefined using the smaller data structures as follows:

```
For (I = 0; I <300; I++)
{
        Gd1.C[I] = Gd1.A[I] + Gd1.B[I];
}
For (I = 300; I < 600; I++)
{
        Gd2.C[I] = Gd2.A[I] + Gd2.B[I];
}
```

At step 218, method 200 determines whether there are any other loop routines exist within the relevant computer code. If there are more loop routines, method 200 moves to step 202 where the next loop routine is selected. Method 200 repeats steps 202 through 218 until the data arrays for each loop routine have been redefined in new data structures.

At step 220, linker 42 uses the new data structures to put the corresponding data into respective blocks of external memory 14. The data for each particular loop routine is stored as a single block in external memory 14. Method 200 then ends.

From external memory 14, the data for a given loop routine can be retrieved as a single block and input into data cache memory 24 whenever that loop routine is executed. Once in data cache memory 24, individual data elements can be retrieved and operated upon by process module 26. Because all data for the relevant loop routine is simultaneously present in data cache memory 24, the same information does not need to be repeatedly written into the data cache memory data throughout execution. In this way, the data cache miss and also the external memory access delay is minimized. Accordingly, the present invention optimizes the performance of computer architecture 10.

Although the present invention and its advantages have been described in detail, it should be understood that various changes, substitutions, and alterations can be made therein without departing from the spirit and scope of the invention as defined by the appended claims.

What is claimed is:

1. A method for optimizing the fetching of information for functions implementing instructions within a loop routine, the method comprising:

identifying all functions within a loop routine, wherein the loop routine includes a plurality of instructions, and wherein each instruction is implemented by performing one or more functions;

creating a function sequence file in which information for the functions is arranged according to a calling sequence of the loop routine, the calling sequence being the order in which the functions are called in the loop routine; and storing the information for the functions that implement each instruction into an external memory according to the function sequence file so that the information can be retrieved as a single block from external memory into cache memory when the loop routine is executed.

2. The method of claim 1 further comprising specifying the function sequence file to be a text file.

3. The method of claim 1 further comprising selecting the loop.

* * * * *